Nov. 2, 1926.

E. BUCKINGHAM

GEAR HOBBING MACHINE

Filed Oct. 9, 1922

INVENTOR
Earle Buckingham
BY
Joseph K. Schofield
ATTORNEY

Nov. 2, 1926.
E. BUCKINGHAM
1,605,166
GEAR HOBBING MACHINE
Filed Oct. 9, 1922   2 Sheets-Sheet 2
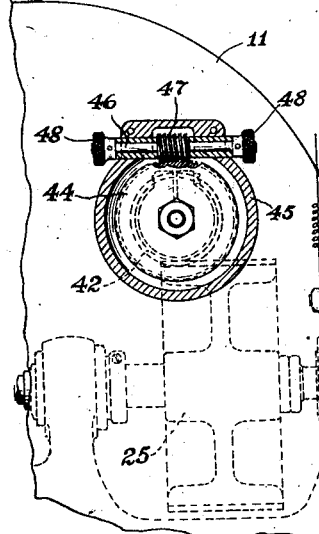
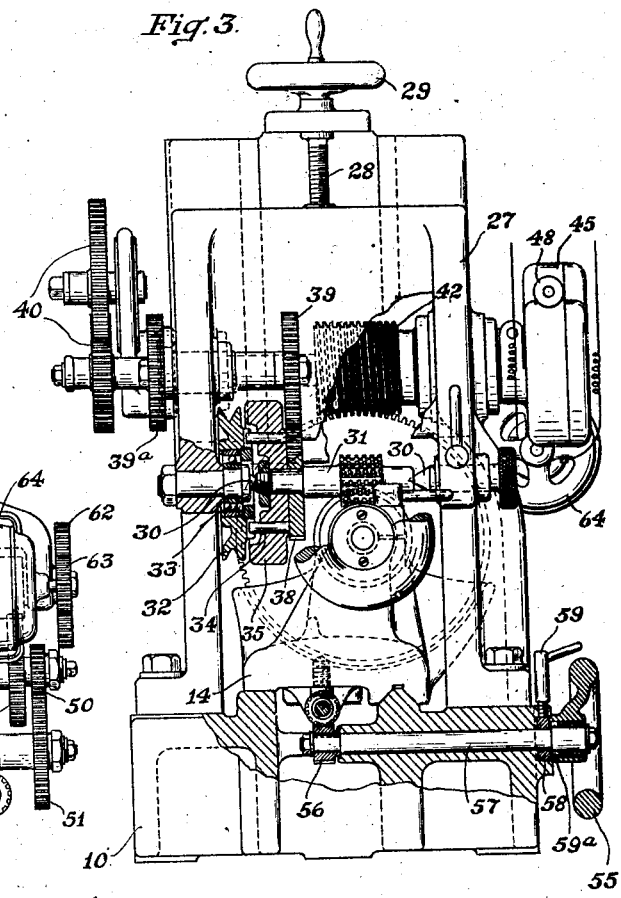
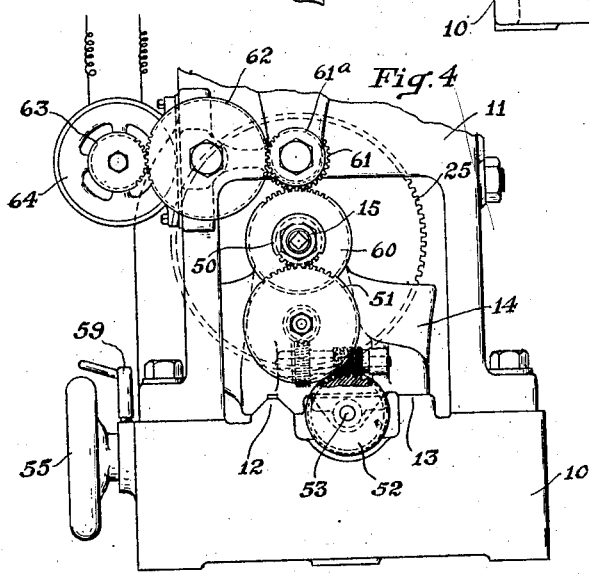
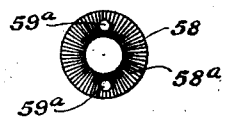
INVENTOR
Earle Buckingham
BY
Joseph H. Schofield
ATTORNEY Patented Nov. 2, 1926.

1,605,166

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

GEAR-HOBBING MACHINE.

Application filed October 9, 1922. Serial No. 593,309.

This invention relates to a gear hobbing machine and in particular to a hobbing machine adapted to accurately and quickly generate gears within a limited range of diameters.

A principal object of the present invention is to provide a novel but simple form of indexing means for the work spindle to continuously rotate the spindle while a carriage on which it is mounted is traversed or fed past the cutter.

One feature which enables me to accomplish the above object is that I provide a worm driven through a train of gears from the driving means for the hob. In engagement with this worm is a wide face spur gear directly mounted on the work spindle, the spur gear being wide enough so that its teeth may remain in mesh with the worm throughout the engagement of the hob with the work.

Another object of the invention is to provide an improved driving means for the cutter or hob, the initial driving means preferably being in direct alignment with the hob, additional power supplying means being interposed in the driving train between the hob and the work spindle to provide means for taking up all back lash between members of the main driving train and assisting in driving the mechanism.

Preferably to accomplish the last named object I utilize a small motor constantly supplied with current to produce a rotative or torque effect. On the armature of this small torque motor I place a pinion engaging a gear fastened directly to the work supporting and rotating spindle. In this way the motor which is continuously rotated during operation constantly tends to advance the work spindle as far as permitted by the positively driven connections from the driving means for the hob spindle. The gear train between the hob and the work spindle thus constitutes a timing mechanism only, and power for the driving of the work spindle is obtained from the small auxiliary motor.

Another object of the invention is to provide a rapid traverse mechanism for rapidly moving the work spindle and its carriage back and forth past the hob so that the table and gear blank can be quickly positioned while the preliminary adjustments of the machine are being made. Also this mechanism may be so arranged that it may be used independently of as well as while the feeding mechanism is in operation.

A still further object of the invention is to provide means in the driving train between the hob and work spindle to change the relative rotative positions of the work spindle and hob, that is, to rotate one of these members relatively to the other. This enables an operator to properly position the gear blank relative to the teeth of the hob so that a partly finished gear may be placed in position and the hob adjusted relative thereto to properly engage the teeth of the hob with those on the gear.

With these and other objects in view, my invention consists in the features of construction and operation set forth in the following specification and illustrated in the accompanying drawings.

In the embodiment of the invention illustrated, the axis of the work spindle is fixed and the axis of the hob spindle is movable in a plane toward or from the work spindle to adjust the machine for different sizes of gears. In the embodiment of the invention illustrated, the axes of the hob and work spindle in all adjustments are maintained precisely at right angles to each other.

In the accompanying drawings annexed hereto and forming a part of this specification, I have shown my invention applied to a special form of gear hobbing machine but it will be understood that the invention can be otherwise embodied and that the drawings are not to be construed as defining or limiting the scope of the invention, the claims appended to this specification being relied upon for that purpose.

In the drawings:

Fig. 3 is a front elevation of the complete machine.

Figure 1:
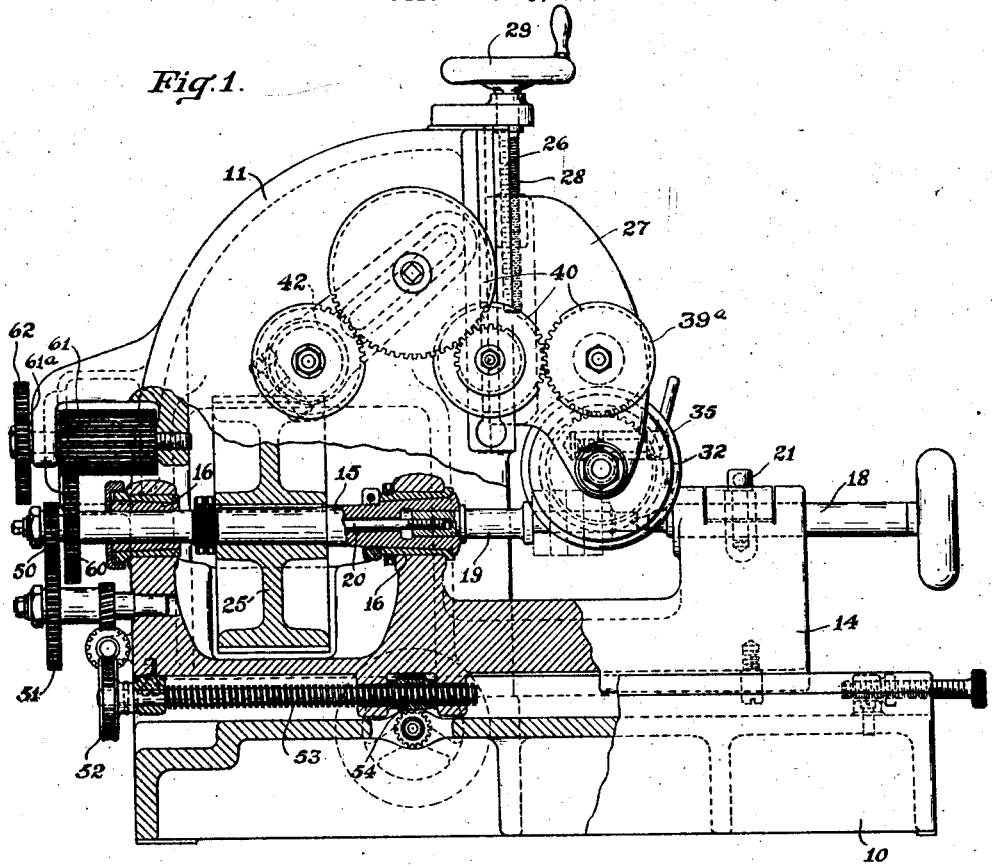
Figure 1 is a side elevation of the complete machine, parts being shown in section to more clearly define their construction.

Figs. 3ª and 3ᵇ are front and side views respectively of a detail.

Fig. 4 is a rear elevation.

Fig. 5 is a side elevation of a portion of the construction.

In the above mentioned drawings, I have shown but one embodiment of the invention which is now deemed preferable but it is to be understood that changes and modifications may be made within the scope of the appended claims without departing from the spirit of the invention.

Briefly, my invention in its broadest aspect comprises the following principal parts: first, a base or frame provided with horizontal ways; second, a work supporting table slidably mounted on the ways on which is provided a rotatably mounted work spindle; third, a hob carrying head preferably slidably mounted on vertical ways on a housing preferably integral with the base; fourth, driving means for the hob; fifth, a driving train between the hob and the work spindle, the last driving element of the train being a worm in mesh with a wide faced spur gear directly connected to the work spindle; sixth, a small motor forming a power supplying element associated with the work spindle and forming a driving element for this spindle, which motor is adapted to be constantly driven to advance the work spindle rotatively in one direction; and seventh, feeding and rapid traversing mechanism for advancing the work spindle axially to advance the work past the hob.

Referring more in detail to the figures of the drawings, I provide a base or frame 10 having a vertically disposed housing 11 integrally formed thereon. On the base 10 are horizontal ways 12 and 13 extending longitudinally and adapted to support a movable table 14. On this table 14 is a horizontal work spindle 15 adapted to be rotatably supported in suitable bearings 16. Another bearing may be provided in a tailstock 17 provided on the table 14 forming an adjustable means to support a tailstock spindle 18 engaging the outer or free end of a work carrying arbor 19. Any convenient means such as the threaded rod 20 extending through the work spindle 15 may be used to support the work arbor 19 in position, and clamping means 21 for the spindle 18 are provided so that the arbor 19 may be held securely in position. On the work spindle 15 is a wide faced spur gear 25 keyed or otherwise rigidly fastened thereto. The gear teeth of this gear are very accurately generated so that this gear may provide an accurate indexing mechanism for rotating the work spindle 15 in timed relation to the rotation of the hob. This driving connection for the work spindle 15 will presently be more fully described.

Vertical ways 26 are provided on the front face of the housing 11 on which a head 27 may be slidably mounted. In order to adjust the position of this head, an adjusting screw 28 is provided which may be rotated by the hand wheel 29. On this vertically movable head 27 is a pair of aligned centers 30, one of which is axially adjustable, both of these centers being adapted to support the hob carrying spindle 31 in a horizontal axis extending transversely of the base. Also mounted co-axially with these centers 30 and preferably mounted within a separate bearing is a driving pulley 32, the one shown being adapted to be driven by a round belt. As shown a ball bearing 33 mounted so as to surround one of the center members 30 provides a rotatable bearing for the driving pulley 32. Preferably also the hob spindle 31 is connected to this pulley by means of pins 34 provided in a disk 35 keyed to the hob spindle 31. These pins 34 engage radial slots in one of the faces of the driving pulley 32. In this way any side thrust of the hob spindle due to the tension of a driving belt is avoided. Preferably also the disk 35 is heavily weighted to cause considerable flywheel effect to aid the smoothness of operation.

Figure 2:
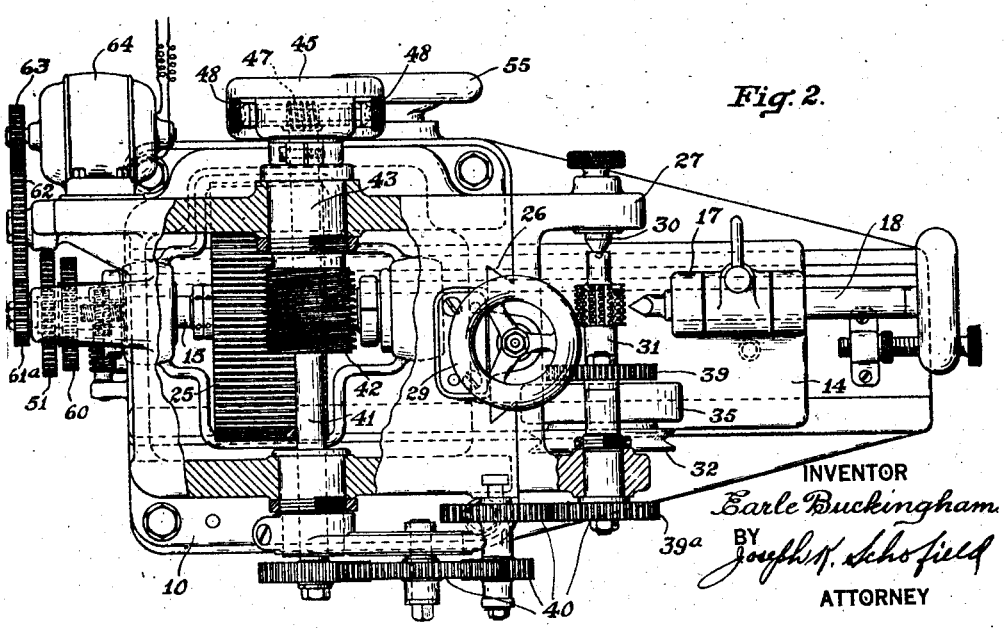
Fig. 2 is a plan view of the complete machine, parts being broken away to more clearly show the indexing mechanism for the work spindle.

Also on the hob spindle 31 is a gear 38 suitably fastened thereto which is in mesh with a gear 39 of a driving train 40 shown clearly in Figs. 1 and 2. The gears of this gear train 40 extend from the hob spindle 31 directly to a shaft 41 lying horizontally and transversely within the housing 11. Surrounding this horizontal shaft 41 is an accurately formed worm 42 which is adapted to mesh with the teeth of the spur gear 25 on the work spindle 15 referred to above. Preferably some of the gears of the gear train 40 are so disposed that they readily may be removed and others of different diameters substituted so that the speed ratio between the hob spindle 31 and the spur gear 25 on the work spindle 15 may be changed to accommodate the machine for forming gears having different numbers of teeth. It will therefore be seen that the hob and work spindle are directly and positively connected together so that they are rotated precisely in timed relation to each other.

Preferably and as shown, the worm 42 in mesh with the gear 25 instead of being directly attached to the transverse shaft 41 is mounted on a sleeve 43 surrounding this shaft. The shaft 41 at one end has a worm wheel 44 directly fastened thereto and on the sleeve 43 carrying the worm 42 is mounted a housing 45 adjacent and surrounding the worm wheel 44. This housing 45 is therefore adapted to rotate with the sleeve 43. Within the housing 45 is a transverse shaft 46 on which is a small worm 47 engaging the worm wheel 44. Means such as the knurled heads 48 shown in Figs. 2 and 4 are provided by means of which the sleeve 43 and worm 42 may be rotated relatively to the worm wheel 44 and shaft 41. This mechanism may therefore be used to slightly rotate the worm 42 and with it the spur gear 25 and work spindle 15 while the hob spindle 31 is stationary. This mechanism may therefore be used to properly engage a gear blank on the work arbor with the hob on the spindle 31.

From the above it will be seen that mechanism has been provided for rotating a hob spindle and hob and rotating a work spindle in timed relation thereto. The timed relation of these two members may be varied within wide limits. It will also be seen that the angle subtended between the work spindle 15 and the hob spindle 31 is fixed, the particular angle being a right angle.

Feeding means for the table 14 carrying the work spindle 15 is provided so that a slow feed may be given the work on the spindle 15 past the hob spindle 31. As preliminary adjustments of the table 14 are required rapid traverse means for this table are also provided which are preferably formed as a part of the feeding means.

On the work spindle 15, therefore, preferably at its outer or rear end, is a small gear 50 adapted to mesh with a gear 51 of a driving train connected to a worm wheel 52 on the rear end of a long worm or screw 53 rotatably mounted on the lower surface of the table 14. This screw or worm 53 is adapted to mesh with the threaded surface of a nut 54 mounted within the base 10. It will be seen that with the nut 54 held non-rotatably, rotation of the work spindle 15 and rotation of the screw 53 will cause the table 14 to be advanced in one direction. This advances the gear blank on spindle 15 very slowly in a feeding direction past the hob on spindle 31. This mechanism therefore is made use of during normal operation to automatically feed the work in an axial direction past the hob while it is being constantly rotated.

Means are also provided to manually rotate the nut 54 preferably by means of the hand wheel 55 so that with the clamp for this nut 54 loosened rotation of the hand wheel 55 in either direction will rapidly rotate the nut 54 and also rapidly traverse the work table 14 and gear blank past the hob in either direction. This mechanism may therefore be used for quickly adjusting the work table 14 and work to any desired position. Preferably the nut 54 is provided with helical gear teeth on its periphery which are engaged by corresponding helical teeth of a gear 56 on the rod 57 to which the hand wheel 55 is fastened. Surrounding the rod 57 adjacent the hand wheel 55 is a ring 58 placed within a suitable recess in the base 10. A clamping screw 59 is adapted to press against the ring 58 and thus prevent its being rotated. On the outer side surface of the ring 58, ratchet teeth or serrations 58ª are formed adapted to be engaged by pawls 59ª retained resiliently within recesses in the hand wheel 55. It will therefore be seen that with the clamp 59 engaging the ring 58, the hand wheel 55 can be rotated in either direction which will cause the table 14 to be advanced rapidly in the feeding or opposite direction. To move the table 14 and spindle 15 entirely freely in either direction, it is only necessary to release the clamp 59 when the table and spindle may be traversed rapidly in either direction. With the screw 59 in clamping position, the detent 58ª is sufficient to hold the nut 56 from rotating during the feeding operation.

It will be understood that unless means are provided to take up back lash or lost motion between the members of the driving gears 38—39 and the gears of the train 40 for the work spindle 15, slight inaccuracies in the work may be caused by irregular rotation of this work spindle 15. I therefore provide special means for holding the work spindle 15 accurately in position so that the lost motion will always be taken up on the same side of the driving members and thus inaccuracies due to this cause may be completely eliminated. For this purpose, I mount a gear 60 adjacent the pinion 50 on the end of a work spindle 15 and in mesh with this gear, I mount an elongated pinion 61 directly connected to gear 60 and rotatably mounted in suitable bearings provided in the housing 11. In mesh with a pinion 61ª on the same shaft as this elongated pinion 61 is an idler gear 62 (see Figs. 2 and 4) which is in engagement with a pinion 63 on the armature shaft of a small motor 64. The motor 64 is constantly supplied with power and thus is adapted to constantly urge the driving spindle 15 in one direction, this direction preferably being in the direction which the work spindle 15 is rotated by the driving train from the hob spindle 31.

It will thus be seen that this auxiliary motor provides also an auxiliary source of power for the work spindle 15 and thus supplements the action of the main driving means shown as a driving pulley 32 in alignment with the hob spindle 31. It will also be seen that the rotative effect or torque of this motor will be constantly exerted in one direction and that all lost motion or back lash between the members of the driving train or the work spindle will be constantly taken up on the same side. By varying the current supplied to this motor armature, the torque may be varied within very wide limits to assure that the spindle may be held positively in its advanced position.

It will therefore be seen that two sources of power for operating the hobbing machine are provided one directly engaging and in alignment with the hob spindle and the other connected in the driving connections between the hob spindle 31 and work spindle 15. The timed relation between the hob spindle 31 and work spindle 15 is controlled by the gears between these members in the usual way and this relation is not disturbed by this additional source of power. This geared connection between the hob spindle 31 and the work spindle 15 operates merely as timing gears and are not required to transmit power.

What I claim is:

1. A gear hobbing machine comprising in combination, a base, a gear blank spindle rotatably mounted on said base, a head on said base carrying a rotatable hob spindle, rotating means for said hob spindle directly connected thereto, separate driving means for said blank spindle, and means connecting said hob spindle and blank spindle to cause them to rotate in timed relation to each other.

2. A gear hobbing machine comprising in combination, a base, a gear blank spindle rotatably mounted on said base, a head on said base carrying a rotatable hob spindle, rotating means for said hob spindle directly connected thereto, separate driving means for said blank spindle, and gearing connecting said hob spindle and blank spindle to cause them to rotate in timed relation to each other.

3. A gear hobbing machine comprising in combination, a base, a gear blank spindle rotatably mounted on said base, a head on said base carrying a rotatable hob spindle, rotating means for said hob spindle directly connected thereto, separate driving means for said blank spindle, and gearing connecting said hob spindle and blank spindle to cause them to rotate in timed relation to each other, said gearing being adapted to be changed whereby the timed relation between the rotation of the hob and spindle may be varied.

4. A gear hobbing machine comprising in combination, a base, a gear blank spindle rotatably mounted on said base, a head on said base carrying a rotatable hob, means to rotate the hob and spindle in timed relation to each other, and auxiliary means to constantly urge the spindle in the same direction as driven so that all lost motion between elements of the spindle driving means may be constantly taken up.

5. A gear hobbing machine comprising in combination, a base, a gear blank spindle rotatably mounted on said base, a head on said base carrying a rotatable hob, means to rotate the hob and spindle in timed relation to each other, means to axially advance the spindle during operation, and auxiliary means to constantly urge the spindle in the same direction as driven so that all lost motion between elements of the spindle driving means may be constantly taken up.

6. A gear hobbing machine comprising in combination, a base, a table mounted thereon, a gear blank spindle rotatably mounted on said table, a head on said base carrying a rotatable hob, means to adjust the position of said hob toward or from the spindle, means to rotate the hob and spindle in timed relation to each other, means to axially advance the spindle during operation, and auxiliary means to constantly urge the spindle in the same direction as driven so that all lost motion between elements of its driving means may be taken up while it is being axially advanced during operation.

7. A gear hobbing machine comprising in combination, a base, a gear blank spindle rotatably mounted on said base, a head on said base carrying a rotatable hob, means to adjust the position of said hob, means to rotate the hob and spindle in timed relation to each other, and auxiliary power supplying means to constantly urge the spindle in the same direction as driven so that all lost motion between elements of its driving means may be taken up.

8. A gear hobbing machine comprising in combination, a base, a gear blank spindle rotatably mounted on said base, a head on said base carrying a rotatable hob, means to rotate the hob and spindle in timed relation to each other, and auxiliary power means to each spindle to constantly associated with said spindle to constantly urge it in the same direction as driven so that all lost motion between elements of its driving means may be taken up.

9. A gear hobbing machine comprising in combination, a base, a table mounted thereon, a gear blank spindle rotatably mounted on said table, a head on said base carrying a rotatable hob spindle, primary driving means for rotating the hob spindle directly connected thereto, means to rotate the hob spindle and spindle in timed relation to each other, and auxiliary driving means for said gear blank spindle constantly urging the spindle in the same direction it is driven by the primary driving means.

10. A gear hobbing machine comprising in combination, a base, a gear blank spindle rotatably mounted on said table, a head on said base carrying a rotatable hob spindle, primary driving means for rotating the hob spindle directly connected thereto, means to rotate the hob and spindle in timed relation to each other, and auxiliary driving means for said gear blank spindle independent of the driving means for the hob spindle constantly urging the spindle in the same direction it is driven by the primary driving means.

11. A gear hobbing machine comprising in combination, a base, a table mounted thereon, a gear blank spindle rotatably mounted on said table and adapted to be axially movable therewith, a head on said base carrying a rotatable head, means in alignment with the head spindle to rotate the hob and spindle in timed relation to each other, and auxiliary driving means directly coupled to the spindle constantly urging the spindle in the same direction it is driven by the primary driving means.

In testimony whereof, I hereto affix my signature.

EARLE BUCKINGHAM.